Dec. 17, 1940.    H. P. SCHRANK    2,225,595
PNEUMATIC TIRE STRUCTURE
Filed Oct. 1, 1938    3 Sheets-Sheet 1

INVENTOR
HARRY P. SCHRANK
BY
J. Ralph Barrow
ATTORNEY

Dec. 17, 1940.  H. P. SCHRANK  2,225,595
PNEUMATIC TIRE STRUCTURE
Filed Oct. 1, 1938  3 Sheets-Sheet 2
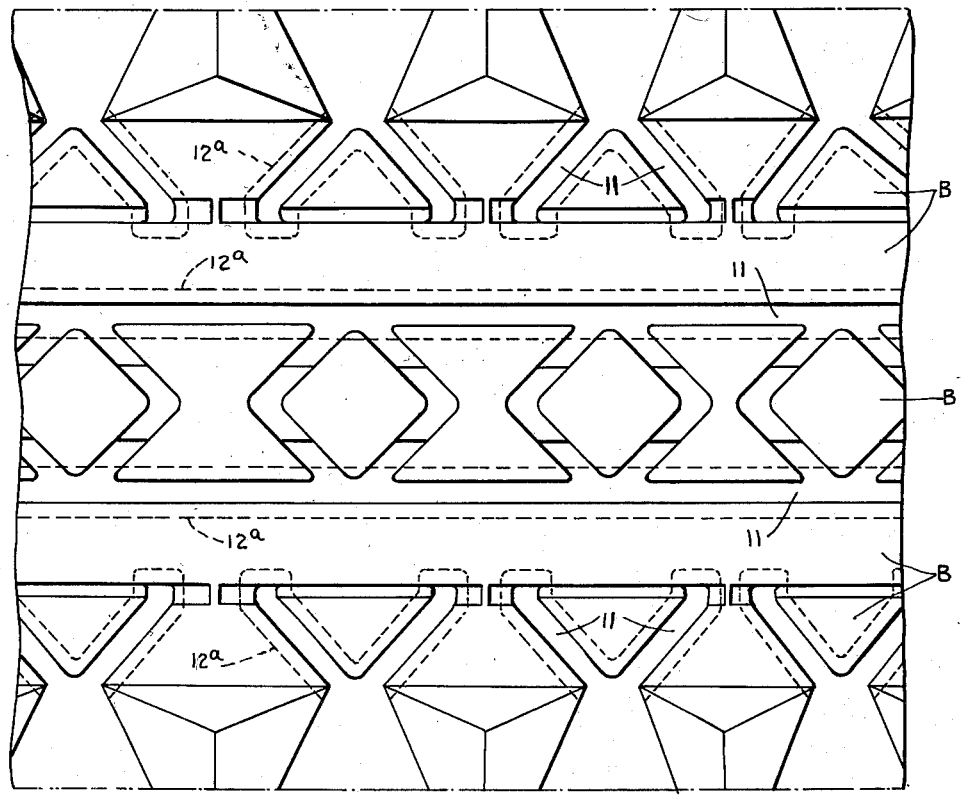
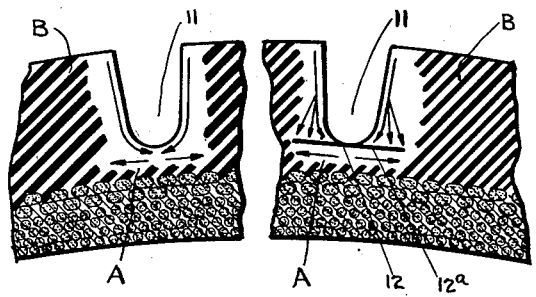
INVENTOR
HARRY P. SCHRANK
BY
*J. Ralph Barrow,*
ATTORNEY Dec. 17, 1940.  H. P. SCHRANK  2,225,595
PNEUMATIC TIRE STRUCTURE
Filed Oct. 1, 1938   3 Sheets-Sheet 3

INVENTOR
HARRY P. SCHRANK
BY
J. Ralph Barrow
ATTORNEY

Patented Dec. 17, 1940

2,225,595

UNITED STATES PATENT OFFICE 2,225,595

PNEUMATIC TIRE STRUCTURE

Harry P. Schrank, Munroe Falls, Ohio, assignor to Seiberling Rubber Company, Barberton, Ohio, a corporation of Ohio Application October 1, 1938, Serial No. 232,754

2 Claims. (Cl. 152—209)

This invention relates to pneumatic tire structures.

Pneumatic tire structures as heretofore provided comprise a carcass of rubberized fabric on which is applied a tread of rubber, the inner portion of which is bonded to the fabric structure and must flex more or less therewith and the outer portion of which is formed with grooves dividing the tread into a plurality of projections having free edges for the purpose of preventing skidding.

In the past, it has been necessary in the design of a tread for a tire so to balance the outer or non-skid portion with the inner or cushioned rubber portion of the tread so that the outer portion would provide sufficient rubber to give long wear along with effective non-skidding and so that the inner portion would flex sufficiently, and also stretch, along with the carcass to prevent separation of the tread from the carcass. The non-skid portion of the tire tread and the inner or cushioned portion which is bonded to the carcass have therefore each been modified with respect to the other so that these two zones of the tread have not heretofore carried out their required functions as perfectly and satisfactorily as is possible.

It has heretofore been suggested to use an inner or cushion zone of rubber in the tread sufficiently thin so that it will flex readily with the carcass to prevent separation while at the same time providing projections of sufficient area and thickness to take the load and wear to provide long life for the tire, but owing to the stresses which localize at the bottoms of the grooves due to compression under load and due to stretching of the carcass under the inflation pressure and due to flexing of the tread with the carcass there is a tendency to cause the tread to crack at the bottom of the grooves and these cracks gradually develop so that they extend into the carcass allowing dirt and moisture to get into the carcass and destroy the tire.

The present inventor has found that the objections to tires as heretofore produced as stated in the foregoing paragraph may all be overcome and a tire tread provided for a tire which will give maximum wear without tendency to separate or without tendency to crack, by separating as by partly slitting the inner and outer zones of rubber to such an extent that the non-skid portion of the tread and the inner portion of tread may have increased independence of action whereby each portion of the tread may more satisfactorily carry out its purposes or functions and obviate the above objections.

A further purpose of the invention is to provide a structure in which slits may extend inwardly from the outer edges of the non-skid projections on non-radial, preferably curved lines to the bottom of the grooves and then outwardly forming a series of nicks at sides of the non-skid projections promoting the non-skid effect of the tire tread while at the same time increasing the flexibility of the inner portions of the tire tread with respect to the non-skid portion thereof so that the inner or cushion portion will more effectively flex with the carcass and so that cracks will not develop at the bottoms of the grooves.

The foregoing and other purposes and objects of the invention are attained in the tire structure illustrated in the accompanying drawings and described below. It is to be understood that the invention is not limited to the specific form thereof which is shown and described.

Of the accompanying drawings:

Figure 3 is a view similar to Figure 1 of a tire tread, this tire tread being shown developed or flattened out, so that the form and arrangeemnt of the slit will more clearly appear.

Figure 4 is a part radial section, greatly enlarged, through a prior art tire.

Figure 4a is a similarly enlarged part radial section through a tire such as shown in Figures 1 and 3.

Figure 1:
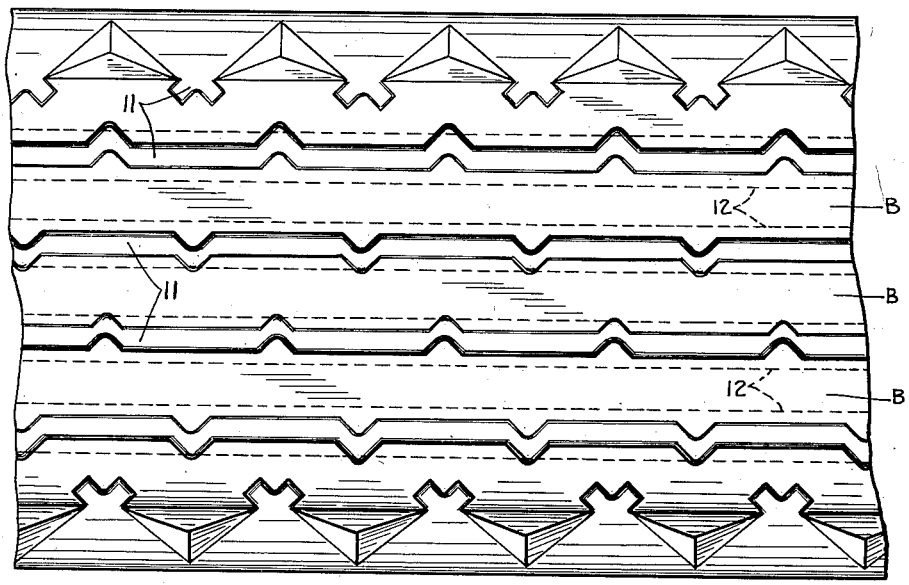
Figure 1 is an outer peripheral plan view of a portion of a tire embodying the invention.

Referring to the drawings, the letter A denotes the inner or cushion zone of rubber in a tire tread which is bonded by vulcanization, as usual, onto the tire carcass 10. The tread has an outer or non-skid zone B therein which may be separated into sections or ribs or buttons by grooves such as indicated at 11, 11. To improve this tire, slits 12, 12 are formed in the sides of the projections in the tread at or adjacent to the bottoms of the grooves 11 and extending into the rubber of the treads preferably at both sides of central grooves so as to leave connections at C, C between the inner zone A and outer zone B of the tread of substantially smaller area than the projections formed by grooves 11, whereby zone A may more readily flex or stretch with the carcass 10 and whereby the stresses tending to set up at the bottom of grooves 11 will be distributed over the wide slits 12 to eliminate cracking of the tread at the bottoms of the grooves 11.

Figure 2:
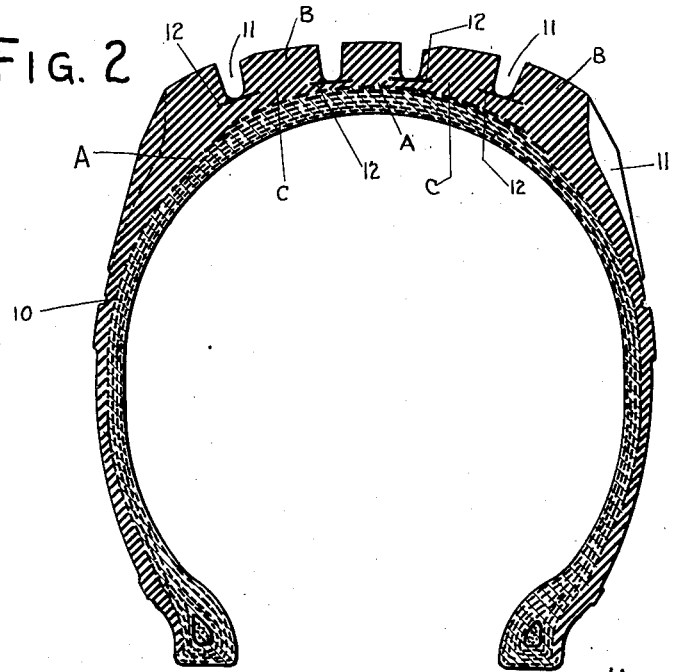
Figure 2 is a radial section through such a tire.

In Figure 3, the invention is shown applied to a tread of somewhat different design and whereas in Figures 1 and 2, the slits 12 are formed only in the central grooves 11, in Figure 3, the slits at 12ᵃ are shown formed in the outer sides of the non-skid projections or buttons at the shoulders of the tread as well as in the sides of the projections in the central grooves.

In Figure 4, there is shown very greatly enlarged view of a portion of a prior tire tread, the arrows extending down the side of the groove toward the bottom indicating the effect of compression on the rubber at such a groove when the tire is under load. The arrows extending in opposite directions in the rubber below the bottom of the groove transversely of the tire in Figure 4 indicate the effect of stretch of the carcass under the inflation pressure applied to the thin connections of the tread rubber at the bottom of the grooves. These forces along with the flexing of the rubber below the bottom of the grooves with the carcass are the forces which tend to crack the rubber inwardly from the bottom of the groove to the carcass. As shown by arrows in Figure 4ᵃ when the tread is formed with slits in accordance with the invention, the compressive forces are distributed over the areas of the slits 12 or 12ᵃ and the inner portion of the tread under the groove is free to stretch and flex with the carcass without tending to start cracks.

Figure 5:
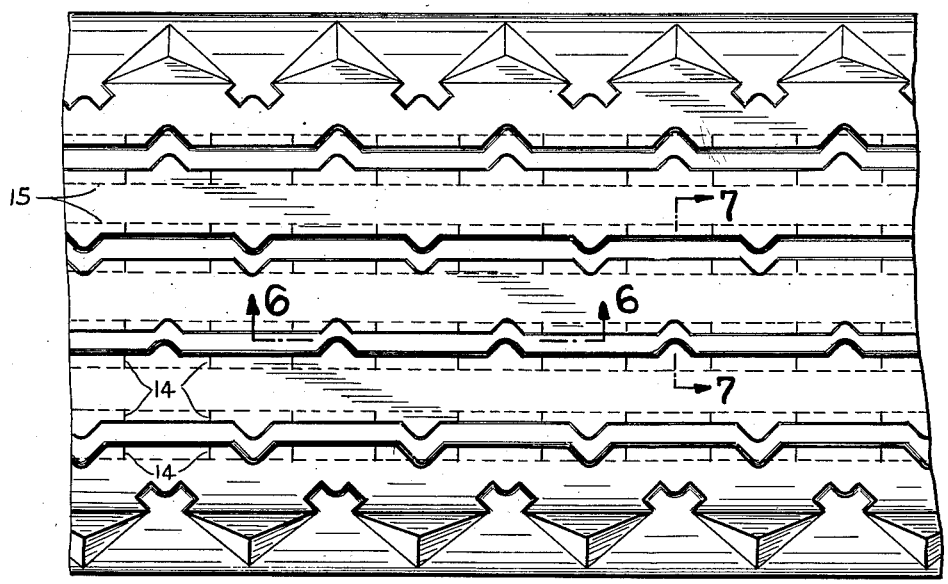
Figure 5 is a view similar to Figure 1 of a tire showing a modified form of slitting to carry out the invention so as to give additional non-skid qualities.
Figure 6:
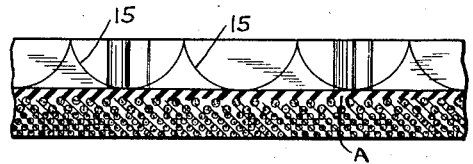
Figure 6 is a section along line 6—6 of Figure 5.
Figure 7:
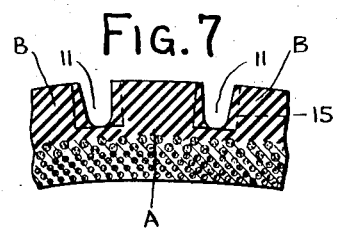
Figure 7 is a section along line 7—7 of Figure 5.

Referring to Figures 5, 6, and 7, the invention may be carried out to secure additional non-skid effect as well as the other advantages of the invention by slitting inwardly from the points 14, 14 from the outer peripheries of the sides of the projections along curvilinear paths as indicated at 15, 15 to provide an inner tread zone flexing more readily with the carcass to provide an outer tread zone more effectively taking wear and in which the compressive forces are distributed over the areas of the slits as will be understood and providing also a series of nicks at the sides of the projections at points 14, 14, the edges of which will provide additional non-skid qualities in the tread. The tire shown in Figure 5 may be made by first vulcanizing the tire with the circumferentially extending ribs defined by circumferential recesses and then slitting the tire in the manner indicated, by provision of a revolving knife arranged to be swung about a pivot along the arcs 15, the tire being intermittently moved into association with the knife, the movement being indexed to space the arcuate cuts as required. The method or means for cutting the tire form no part of this invention.

It is apparent from Figures 1 to 4, inclusive, that by treatment of a tire in accordance with the invention, tread separation and cracking are avoided and a long-wearing tread is provided, and that by the treatment of a tire in accordance with the invention as disclosed in Figures 5 to 7, the tire is also improved as to its non-skid qualities.

Obviously, modifications of the invention other than those disclosed herein may be resorted to without departing from the spirit thereof or the scope of the appended claims.

What is claimed is:

1. A pneumatic tire structure including a carcass and a tread, said tread having an inner zone of cushioning rubber bonded to the carcass and an outer non-skid zone of wear-resisting rubber in which are formed one or more grooves or recesses dividing the tread into ribs or projections extending circumferentially of the tire, the sides of said ribs or projections having slits extending therein laterally and circumferentially of the tire so as to separate a substantial amount of rubber in the outer zone of the tread in the ribs or projections from the rubber in the inner zone of the tread inwardly of the non-skid zone, producing an independence of flexing action in the two zones, whereby the inner zone of the tread may flex under load with the carcass without separation therefrom, and whereby the outer zone of the tread has increased wear resistance without producing cracks at the bottoms of the grooves or recesses, the two zones having circumferentially extending connections between them of less area than the ribs or projections.

2. A pneumatic tire structure set forth in claim 1, such slits extending inwardly of the outer periphery of the tire and providing non-skidding nicks on the projections.

HARRY P. SCHRANK.